(12) United States Patent
Hahn-Carlson

(10) Patent No.: US 8,712,884 B2
(45) Date of Patent: Apr. 29, 2014

(54) TRANSACTION FINANCE PROCESSING SYSTEM AND APPROACH

(75) Inventor: Dean W. Hahn-Carlson, Lilydale, MN (US)

(73) Assignee: Syncada LLC, Minneapolis, MN (US)

( * ) Notice: Subject to any disclaimer, the term of this patent is extended or adjusted under 35 U.S.C. 154(b) by 1114 days.

(21) Appl. No.: 11/867,390

(22) Filed: Oct. 4, 2007

(65) Prior Publication Data

US 2008/0086396 A1 Apr. 10, 2008

Related U.S. Application Data

(60) Provisional application No. 60/849,920, filed on Oct. 6, 2006.

(51) Int. Cl.
*G07F 19/00* (2006.01)
*H04M 15/00* (2006.01)
(52) U.S. Cl.
USPC ............... 705/34; 705/17; 705/40; 705/53; 705/77; 705/79
(58) Field of Classification Search
None
See application file for complete search history.

(56) References Cited

U.S. PATENT DOCUMENTS

| | | | |
|---|---|---|---|
| 4,114,027 A | 9/1978 | Slater et al. |
| 4,270,042 A | 5/1981 | Case |
| 4,305,059 A | 12/1981 | Benton |
| 4,412,287 A | 10/1983 | Braddock, III |
| 4,507,778 A | 3/1985 | Tan |
| 4,567,359 A | 1/1986 | Lockwood |
| 4,713,761 A | 12/1987 | Sharpe et al. |
| 4,725,719 A | 2/1988 | Oncken et al. |
| 4,750,119 A | 6/1988 | Cohen et al. |
| 4,799,156 A | 1/1989 | Shavit et al. |
| 4,926,325 A | 5/1990 | Benton et al. |
| 4,949,272 A | 8/1990 | Vanourek et al. |
| 4,960,981 A | 10/1990 | Benton et al. |
| 4,992,940 A | 2/1991 | Dworkin |
| 4,995,112 A | 2/1991 | Aoyama |
| 4,996,662 A | 2/1991 | Cooper et al. |
| 5,008,827 A | 4/1991 | Sansone et al. |
| 5,017,766 A | 5/1991 | Tamada et al. |
| 5,025,372 A | 6/1991 | Burton et al. |

(Continued)

FOREIGN PATENT DOCUMENTS

| | | | |
|---|---|---|---|
| EP | 0339850 A2 | 2/1989 |
| EP | 0407026 A2 | 1/1991 |

(Continued)

OTHER PUBLICATIONS

Professional Builder (1993) www.highbeam.com, Contracts & Law: Part III 8 pp.

(Continued)

*Primary Examiner* — Fateh Obaid
(74) *Attorney, Agent, or Firm* — Shumaker & Sieffert, P.A.

(57) ABSTRACT

Transaction management for processing payment-related aspects of transactions is facilitated. According to an example embodiment of the present invention, a transaction management approach involves the processing of payments on behalf of a buyer or other owing party. These payments are made, e.g., in connection with accounts payable or other functions implemented by the buyer/owing party. In some applications, the payment processing involves a trade credit approach, wherein payment is made on behalf of the buyer/owing party against a credit-type account.

10 Claims, 5 Drawing Sheets

(56) References Cited

U.S. PATENT DOCUMENTS

| | | |
|---|---|---|
| 5,040,132 A | 8/1991 | Schuricht et al. |
| 5,043,908 A | 8/1991 | Manduley et al. |
| 5,054,096 A | 10/1991 | Beizer et al. |
| 5,077,694 A | 12/1991 | Sansone et al. |
| 5,117,364 A | 5/1992 | Barns-Slavin et al. |
| 5,151,948 A | 9/1992 | Lyke |
| 5,153,842 A | 10/1992 | Dlugos, Sr. et al. |
| 5,159,667 A | 10/1992 | Borrey et al. |
| 5,161,109 A | 11/1992 | Keating et al. |
| 5,168,444 A | 12/1992 | Cukor et al. |
| 5,175,416 A | 12/1992 | Mansvelt et al. |
| 5,208,446 A | 5/1993 | Martinez |
| 5,218,188 A | 6/1993 | Hanson |
| 5,220,501 A | 6/1993 | Lawlor et al. |
| 5,222,018 A | 6/1993 | Sharpe et al. |
| 5,231,569 A | 7/1993 | Myatt et al. |
| 5,238,349 A | 8/1993 | Grace, Sr. |
| 5,285,383 A | 2/1994 | Lindsey et al. |
| 5,293,310 A | 3/1994 | Carroll et al. |
| 5,329,589 A | 7/1994 | Fraser et al. |
| 5,334,823 A | 8/1994 | Noblett, Jr. et al. |
| 5,334,824 A | 8/1994 | Martinez |
| 5,337,246 A | 8/1994 | Carroll et al. |
| 5,357,563 A | 10/1994 | Hamilton et al. |
| 5,393,963 A | 2/1995 | Thomas et al. |
| 5,426,281 A | 6/1995 | Abecassis |
| 5,440,634 A | 8/1995 | Jones et al. |
| 5,483,445 A | 1/1996 | Pickering |
| 5,485,369 A | 1/1996 | Nicholls et al. |
| 5,500,513 A | 3/1996 | Langhans et al. |
| 5,631,821 A | 5/1997 | Muso |
| 5,631,827 A | 5/1997 | Nicholls et al. |
| 5,652,749 A | 7/1997 | Davenport et al. |
| 5,666,493 A | 9/1997 | Wojcik et al. |
| 5,671,362 A | 9/1997 | Cowe et al. |
| 5,677,955 A | 10/1997 | Doggett et al. |
| 5,694,334 A | 12/1997 | Donahue et al. |
| 5,694,551 A | 12/1997 | Doyle et al. |
| 5,699,528 A | 12/1997 | Hogan |
| 5,712,990 A | 1/1998 | Henderson |
| 5,717,989 A | 2/1998 | Tozzoli et al. |
| 5,719,771 A | 2/1998 | Buck et al. |
| 5,732,400 A | 3/1998 | Mandler et al. |
| 5,754,854 A | 5/1998 | Kanamori et al. |
| 5,770,844 A | 6/1998 | Henn |
| 5,774,170 A | 6/1998 | Hite et al. |
| 5,790,790 A | 8/1998 | Smith et al. |
| 5,794,207 A | 8/1998 | Walker et al. |
| 5,799,286 A | 8/1998 | Morgan et al. |
| 5,806,063 A | 9/1998 | Dickens et al. |
| 5,842,178 A | 11/1998 | Giovannoli |
| 5,845,283 A | 12/1998 | Williams |
| 5,870,719 A | 2/1999 | Maritzen et al. |
| 5,892,900 A | 4/1999 | Ginter et al. |
| 5,893,080 A | 4/1999 | McGurl et al. |
| 5,896,530 A | 4/1999 | White |
| 5,897,645 A | 4/1999 | Watters |
| 5,910,896 A | 6/1999 | Hahn-Carlson |
| 5,917,830 A | 6/1999 | Chen et al. |
| 5,918,216 A | 6/1999 | Miksovsky et al. |
| 5,918,229 A | 6/1999 | Davis et al. |
| 5,920,847 A | 7/1999 | Kolling et al. |
| 5,924,082 A | 7/1999 | Silverman et al. |
| 5,924,083 A | 7/1999 | Silverman et al. |
| 5,930,363 A | 7/1999 | Stanford |
| 5,931,917 A | 8/1999 | Nguyen et al. |
| 5,943,670 A | 8/1999 | Prager et al. |
| 5,956,690 A | 9/1999 | Haggerson et al. |
| 5,956,700 A | 9/1999 | Landry |
| 5,960,407 A | 9/1999 | Vivona |
| 5,970,475 A | 10/1999 | Barnes et al. |
| 5,973,685 A | 10/1999 | Schaffa et al. |
| 5,978,567 A | 11/1999 | Rebane et al. |
| 5,982,891 A | 11/1999 | Ginter et al. |
| 5,987,506 A | 11/1999 | Carter et al. |
| 5,991,728 A | 11/1999 | DeBusk et al. |
| 5,991,801 A | 11/1999 | Rebec et al. |
| 5,995,976 A | 11/1999 | Walker et al. |
| 6,012,041 A | 1/2000 | Brewer et al. |
| 6,016,477 A | 1/2000 | Ehnebuske et al. |
| 6,021,202 A | 2/2000 | Anderson et al. |
| 6,026,374 A | 2/2000 | Chess |
| 6,029,140 A | 2/2000 | Martin et al. |
| 6,029,150 A | 2/2000 | Kravitz |
| 6,043,819 A | 3/2000 | LeBrun et al. |
| 6,044,362 A | 3/2000 | Neely |
| 6,047,268 A | 4/2000 | Bartoli et al. |
| 6,055,519 A | 4/2000 | Kennedy et al. |
| 6,058,380 A | 5/2000 | Anderson et al. |
| 6,070,150 A | 5/2000 | Remington et al. |
| 6,085,200 A | 7/2000 | Hill et al. |
| 6,097,834 A | 8/2000 | Krouse et al. |
| 6,115,649 A | 9/2000 | Sakata |
| 6,115,711 A | 9/2000 | White |
| 6,119,163 A | 9/2000 | Montiero et al. |
| 6,128,602 A | 10/2000 | Northington et al. |
| 6,131,087 A | 10/2000 | Luke et al. |
| 6,141,653 A | 10/2000 | Conklin et al. |
| 6,151,588 A | 11/2000 | Tozzoli et al. |
| 6,157,924 A | 12/2000 | Austin |
| 6,167,378 A * | 12/2000 | Webber, Jr. ............... 705/8 |
| 6,169,542 B1 | 1/2001 | Hooks et al. |
| 6,199,046 B1 | 3/2001 | Heinzle et al. |
| 6,204,763 B1 | 3/2001 | Sone |
| 6,209,095 B1 | 3/2001 | Anderson et al. |
| 6,223,168 B1 | 4/2001 | McGurl et al. |
| 6,236,972 B1 * | 5/2001 | Shkedy ..................... 705/1 |
| 6,246,994 B1 | 6/2001 | Wolven et al. |
| 6,254,000 B1 | 7/2001 | Degen et al. |
| 6,260,024 B1 * | 7/2001 | Shkedy ..................... 705/37 |
| 6,266,640 B1 | 7/2001 | Fromm |
| 6,267,292 B1 | 7/2001 | Walker et al. |
| 6,275,813 B1 | 8/2001 | Berka |
| 6,285,916 B1 | 9/2001 | Kadaba et al. |
| 6,317,737 B1 | 11/2001 | Gorelik et al. |
| 6,323,894 B1 | 11/2001 | Katz et al. |
| 6,324,522 B2 | 11/2001 | Peterson et al. |
| 6,324,551 B1 | 11/2001 | Lamping et al. |
| 6,330,550 B1 | 12/2001 | Brisebois et al. |
| 6,338,044 B1 | 1/2002 | Cook et al. |
| 6,357,042 B2 | 3/2002 | Srinivasan et al. |
| 6,381,587 B1 | 4/2002 | Guzelsu |
| 6,389,402 B1 | 5/2002 | Ginter et al. |
| 6,418,441 B1 | 7/2002 | Call |
| 6,421,691 B1 | 7/2002 | Kajitani |
| 6,442,533 B1 | 8/2002 | Hinkle |
| 6,477,510 B1 | 11/2002 | Johnson |
| 6,486,899 B1 | 11/2002 | Bush et al. |
| 6,490,567 B1 | 12/2002 | Gregory |
| 6,493,685 B1 | 12/2002 | Ensel et al. |
| 6,499,036 B1 | 12/2002 | Gurevich et al. |
| 6,505,169 B1 | 1/2003 | Bhagavath et al. |
| 6,505,172 B1 | 1/2003 | Johnson |
| 6,507,826 B1 | 1/2003 | Maners |
| 6,510,383 B1 | 1/2003 | Jones |
| 6,510,384 B2 | 1/2003 | Okano |
| 6,526,443 B1 | 2/2003 | Goldsmith et al. |
| 6,539,360 B1 | 3/2003 | Kadaba |
| 6,571,149 B1 | 5/2003 | Hahn-Carlson |
| 6,598,026 B1 | 7/2003 | Ojha et al. |
| 6,607,081 B2 | 8/2003 | Graef et al. |
| 6,629,081 B1 | 9/2003 | Cornelius et al. |
| 6,673,479 B2 | 1/2004 | McArthur et al. |
| 6,684,384 B1 | 1/2004 | Bickerton et al. |
| 6,687,713 B2 | 2/2004 | Mattson et al. |
| 6,697,702 B1 | 2/2004 | Hahn-Carlson |
| 6,704,612 B1 | 3/2004 | Hahn-Carlson |
| 6,721,613 B1 | 4/2004 | Yamamoto et al. |
| 6,721,715 B2 | 4/2004 | Nemzow |
| 6,741,968 B2 | 5/2004 | Jacoves et al. |
| 6,751,630 B1 | 6/2004 | Franks et al. |
| 6,785,661 B1 | 8/2004 | Mandler et al. |
| 6,789,252 B1 | 9/2004 | Burke et al. |
| 6,792,459 B2 | 9/2004 | Elnozahy et al. |

(56) References Cited

U.S. PATENT DOCUMENTS

| | | |
|---|---|---|
| 6,820,038 B1 | 11/2004 | Wetzer et al. |
| 6,829,590 B1 | 12/2004 | Greener et al. |
| 6,832,212 B1 | 12/2004 | Zenner et al. |
| 6,833,865 B1 | 12/2004 | Fuller et al. |
| 6,850,900 B1 | 2/2005 | Hare et al. |
| 6,873,963 B1 | 3/2005 | Westbury et al. |
| 6,873,997 B1 | 3/2005 | Majjasie et al. |
| 6,879,962 B1 | 4/2005 | Smith et al. |
| 6,882,983 B2 | 4/2005 | Furphy et al. |
| 6,882,986 B1 | 4/2005 | Heinemann et al. |
| 6,889,194 B1 | 5/2005 | Kadaba |
| 6,895,438 B1 | 5/2005 | Ulrich |
| 6,915,268 B2 | 7/2005 | Riggs et al. |
| 6,937,992 B1 | 8/2005 | Benda et al. |
| 6,941,281 B1 | 9/2005 | Johnson |
| 6,944,595 B1 | 9/2005 | Graser et al. |
| 6,973,258 B1 | 12/2005 | Yoo et al. |
| 6,983,278 B1 | 1/2006 | Yu et al. |
| 6,988,111 B2 | 1/2006 | Chow et al. |
| 6,999,943 B1 | 2/2006 | Johnson et al. |
| 7,047,210 B1 | 5/2006 | Srinivasan et al. |
| 7,054,841 B1 | 5/2006 | Tenorio |
| 7,069,234 B1 | 6/2006 | Cornelius et al. |
| 7,069,248 B2 | 6/2006 | Huber |
| 7,076,652 B2 | 7/2006 | Ginter et al. |
| 7,079,176 B1 | 7/2006 | Freeman et al. |
| 7,099,304 B2 | 8/2006 | Liu et al. |
| 7,110,959 B2 | 9/2006 | Hahn-Carlson |
| 7,110,979 B2 | 9/2006 | Tree |
| 7,113,964 B1 | 9/2006 | Bequet et al. |
| 7,117,170 B1 | 10/2006 | Bennett et al. |
| 7,120,871 B1 | 10/2006 | Harrington |
| 7,124,150 B2 | 10/2006 | Majjasie et al. |
| 7,130,822 B1 | 10/2006 | Their et al. |
| 7,131,069 B1 | 10/2006 | Rush et al. |
| 7,133,835 B1 | 11/2006 | Fusz et al. |
| 7,136,467 B2 | 11/2006 | Brockman et al. |
| 7,143,058 B2 | 11/2006 | Sugimoto et al. |
| 7,146,337 B1 | 12/2006 | Ward et al. |
| 7,149,744 B1 | 12/2006 | Tenorio |
| 7,162,458 B1 | 1/2007 | Flanagan et al. |
| 7,177,836 B1 | 2/2007 | German et al. |
| 7,181,017 B1 | 2/2007 | Nagel et al. |
| 7,203,662 B2 | 4/2007 | Das et al. |
| 7,206,768 B1 | 4/2007 | deGroeve et al. |
| 7,222,081 B1 | 5/2007 | Sone |
| 7,243,139 B2 | 7/2007 | Ullman et al. |
| 7,254,588 B2 | 8/2007 | Sung et al. |
| 7,257,560 B2 | 8/2007 | Jacobs et al. |
| 7,263,506 B2 | 8/2007 | Lee et al. |
| 7,324,976 B2 * | 1/2008 | Gupta et al. ............... 705/65 |
| 7,327,952 B2 | 2/2008 | Enomoto |
| 7,340,433 B1 | 3/2008 | Kay et al. |
| 7,346,575 B1 | 3/2008 | Ahles et al. |
| 7,363,261 B2 | 4/2008 | Whitehead et al. |
| 7,373,365 B2 | 5/2008 | Varadarajan et al. |
| 7,386,502 B1 | 6/2008 | Butcher, III |
| 7,392,934 B2 | 7/2008 | Hahn-Carlson et al. |
| 7,415,471 B1 | 8/2008 | Coleman |
| 7,415,617 B2 | 8/2008 | Ginter et al. |
| 7,433,845 B1 | 10/2008 | Flitcroft et al. |
| 7,437,310 B1 | 10/2008 | Dutta |
| 7,448,063 B2 | 11/2008 | Freeman et al. |
| 7,475,024 B1 | 1/2009 | Phan |
| 7,496,519 B2 | 2/2009 | Hahn-Carlson et al. |
| 7,499,875 B1 * | 3/2009 | May et al. ............... 705/26 |
| 7,529,706 B2 | 5/2009 | Kulasooriya et al. |
| 7,536,354 B1 | 5/2009 | deGroeve et al. |
| 7,536,362 B2 | 5/2009 | Starr et al. |
| 7,548,884 B1 | 6/2009 | Thomas |
| 7,558,793 B1 | 7/2009 | Topolovac et al. |
| 7,574,363 B2 | 8/2009 | Bodin |
| 7,574,386 B2 | 8/2009 | Hahn-Carlson et al. |
| 7,587,363 B2 | 9/2009 | Cataline et al. |
| 7,590,575 B2 | 9/2009 | Yu et al. |
| 7,617,146 B2 | 11/2009 | Keaton et al. |
| 7,627,499 B2 | 12/2009 | Hahn-Carlson |
| 7,634,455 B1 | 12/2009 | Keene et al. |
| 7,640,195 B2 | 12/2009 | Von Zimmerman et al. |
| 7,660,788 B1 | 2/2010 | Clark |
| 7,693,791 B2 | 4/2010 | Hahn-Carlson et al. |
| 7,702,563 B2 | 4/2010 | Balson et al. |
| 7,725,372 B2 | 5/2010 | Hahn-Carlson |
| 7,765,136 B2 | 7/2010 | Northington et al. |
| 7,822,653 B2 | 10/2010 | Hahn-Carlson et al. |
| 7,890,395 B2 | 2/2011 | Phelan |
| 7,925,551 B2 | 4/2011 | Hahn-Carlson et al. |
| 7,970,671 B2 | 6/2011 | Hahn-Carlson et al. |
| 8,050,938 B1 | 11/2011 | Green et al. |
| 8,060,410 B2 | 11/2011 | Hahn-Carlson |
| 8,069,054 B2 | 11/2011 | Hahn-Carlson et al. |
| 8,103,575 B1 | 1/2012 | Hinkle et al. |
| 8,126,785 B2 | 2/2012 | Hahn-Carlson et al. |
| 2001/0009002 A1 | 7/2001 | Logan et al. |
| 2001/0011241 A1 | 8/2001 | Nemzow |
| 2001/0014878 A1 | 8/2001 | Mitra et al. |
| 2001/0025262 A1 | 9/2001 | Ahmed |
| 2001/0032154 A1 | 10/2001 | Schlummer |
| 2001/0032171 A1 | 10/2001 | Brink et al. |
| 2001/0032183 A1 | 10/2001 | Landry |
| 2001/0039522 A1 | 11/2001 | Saxon |
| 2001/0047311 A1 | 11/2001 | Singh |
| 2001/0056395 A1 | 12/2001 | Khan |
| 2002/0007302 A1 | 1/2002 | Work et al. |
| 2002/0016765 A1 * | 2/2002 | Sacks ............... 705/39 |
| 2002/0026374 A1 | 2/2002 | Moneymaker et al. |
| 2002/0032649 A1 | 3/2002 | Selvarajan |
| 2002/0035488 A1 | 3/2002 | Aquila et al. |
| 2002/0038277 A1 | 3/2002 | Yuan |
| 2002/0038305 A1 | 3/2002 | Bahl et al. |
| 2002/0040304 A1 | 4/2002 | Shenoy et al. |
| 2002/0042782 A1 | 4/2002 | Albazz et al. |
| 2002/0046081 A1 | 4/2002 | Albazz et al. |
| 2002/0046125 A1 | 4/2002 | Speicher et al. |
| 2002/0046147 A1 | 4/2002 | Livesay et al. |
| 2002/0046169 A1 | 4/2002 | Keresman et al. |
| 2002/0048369 A1 | 4/2002 | Ginter et al. |
| 2002/0049622 A1 | 4/2002 | Lettich et al. |
| 2002/0055850 A1 | 5/2002 | Powell et al. |
| 2002/0059122 A1 | 5/2002 | Inoue et al. |
| 2002/0059134 A1 | 5/2002 | Ebbs et al. |
| 2002/0062278 A1 | 5/2002 | Ingram et al. |
| 2002/0065736 A1 | 5/2002 | Willner et al. |
| 2002/0065738 A1 | 5/2002 | Riggs et al. |
| 2002/0069177 A1 | 6/2002 | Carrott et al. |
| 2002/0072956 A1 | 6/2002 | Willems et al. |
| 2002/0077978 A1 * | 6/2002 | O'Leary et al. ............... 705/40 |
| 2002/0087344 A1 | 7/2002 | Billings et al. |
| 2002/0087455 A1 | 7/2002 | Tsagarakis |
| 2002/0095355 A1 | 7/2002 | Walker et al. |
| 2002/0103661 A1 | 8/2002 | Albazz et al. |
| 2002/0107761 A1 | 8/2002 | Kark et al. |
| 2002/0107794 A1 | 8/2002 | Furphy et al. |
| 2002/0111886 A1 * | 8/2002 | Chenevich et al. ............... 705/30 |
| 2002/0116288 A1 | 8/2002 | Nakajima |
| 2002/0116334 A1 | 8/2002 | Bennett et al. |
| 2002/0116348 A1 | 8/2002 | Phillips et al. |
| 2002/0120570 A1 | 8/2002 | Loy |
| 2002/0123919 A1 | 9/2002 | Brockman et al. |
| 2002/0123973 A1 | 9/2002 | Eccles et al. |
| 2002/0143858 A1 | 10/2002 | Teague et al. |
| 2002/0147655 A1 | 10/2002 | Say |
| 2002/0156797 A1 | 10/2002 | Lee et al. |
| 2002/0161719 A1 | 10/2002 | Manning et al. |
| 2002/0174034 A1 | 11/2002 | Au et al. |
| 2002/0184527 A1 | 12/2002 | Chun et al. |
| 2002/0194174 A1 | 12/2002 | Calkins et al. |
| 2002/0198829 A1 * | 12/2002 | Ludwig et al. ............... 705/40 |
| 2002/0198833 A1 | 12/2002 | Wohlstadter |
| 2003/0004823 A1 | 1/2003 | Sagy |
| 2003/0005876 A1 | 1/2003 | Boswell |
| 2003/0014325 A1 | 1/2003 | Biffar et al. |
| 2003/0018563 A1 | 1/2003 | Kilgour et al. |
| 2003/0026404 A1 | 2/2003 | Joyce et al. |

(56) References Cited

U.S. PATENT DOCUMENTS

| | | |
|---|---|---|
| 2003/0033205 A1 | 2/2003 | Nowers et al. |
| 2003/0033240 A1 | 2/2003 | Balson et al. |
| 2003/0041008 A1 | 2/2003 | Grey et al. |
| 2003/0046089 A1 | 3/2003 | Menninger et al. |
| 2003/0050876 A1 | 3/2003 | Tawara et al. |
| 2003/0055675 A1 | 3/2003 | Klein |
| 2003/0055779 A1 | 3/2003 | Wolf |
| 2003/0055783 A1 | 3/2003 | Cataline et al. |
| 2003/0074206 A1 | 4/2003 | Hoffman et al. |
| 2003/0074298 A1 | 4/2003 | Duam |
| 2003/0093320 A1 | 5/2003 | Sullivan |
| 2003/0097318 A1 | 5/2003 | Yu et al. |
| 2003/0115129 A1 | 6/2003 | Feaver |
| 2003/0117446 A1 | 6/2003 | Esposito-Ross et al. |
| 2003/0126047 A1 | 7/2003 | Hollar et al. |
| 2003/0135425 A1 | 7/2003 | Leavitt |
| 2003/0135435 A1 | 7/2003 | Aharoni |
| 2003/0139985 A1 | 7/2003 | Hollar et al. |
| 2003/0144901 A1 | 7/2003 | Coultier et al. |
| 2003/0149674 A1 | 8/2003 | Good et al. |
| 2003/0154163 A1 | 8/2003 | Phillips et al. |
| 2003/0158811 A1 | 8/2003 | Sanders et al. |
| 2003/0163431 A1 | 8/2003 | Ginter et al. |
| 2003/0187796 A1 | 10/2003 | Swift |
| 2003/0191711 A1 | 10/2003 | Jamison et al. |
| 2003/0195815 A1 | 10/2003 | Li et al. |
| 2003/0200172 A1 | 10/2003 | Randle et al. |
| 2003/0200185 A1 | 10/2003 | Huerta et al. |
| 2003/0212617 A1 | 11/2003 | Stone et al. |
| 2003/0220863 A1 | 11/2003 | Holm et al. |
| 2003/0225883 A1 | 12/2003 | Greaves et al. |
| 2003/0233252 A1 | 12/2003 | Haskell et al. |
| 2003/0233286 A1* | 12/2003 | Hahn-Carlson et al. ........ 705/26 |
| 2003/0233292 A1 | 12/2003 | Richey et al. |
| 2003/0233321 A1 | 12/2003 | Scolini et al. |
| 2004/0010463 A1 | 1/2004 | Hahn-Carlson |
| 2004/0019562 A1 | 1/2004 | Viberg |
| 2004/0034578 A1 | 2/2004 | Oney et al. |
| 2004/0039696 A1 | 2/2004 | Harmon et al. |
| 2004/0049446 A1 | 3/2004 | Seljeseth |
| 2004/0068431 A1 | 4/2004 | Smith et al. |
| 2004/0095237 A1 | 5/2004 | Chen et al. |
| 2004/0098350 A1 | 5/2004 | Labrou et al. |
| 2004/0098663 A1 | 5/2004 | Rey et al. |
| 2004/0107123 A1 | 6/2004 | Haffner et al. |
| 2004/0107125 A1 | 6/2004 | Guheen et al. |
| 2004/0117383 A1 | 6/2004 | Lee et al. |
| 2004/0123129 A1 | 6/2004 | Ginter et al. |
| 2004/0139032 A1 | 7/2004 | Rowan |
| 2004/0153389 A1 | 8/2004 | Lortscher |
| 2004/0153403 A1 | 8/2004 | Sadre |
| 2004/0153407 A1 | 8/2004 | Clubb et al. |
| 2004/0158510 A1 | 8/2004 | Fisher |
| 2004/0172360 A1 | 9/2004 | Mabrey et al. |
| 2004/0172368 A1 | 9/2004 | Johnson |
| 2004/0181468 A1 | 9/2004 | Harmon et al. |
| 2004/0184163 A1 | 9/2004 | Nishioka et al. |
| 2004/0186806 A1 | 9/2004 | Sinclair et al. |
| 2004/0187075 A1 | 9/2004 | Maxham et al. |
| 2004/0201074 A1 | 10/2004 | Khandros et al. |
| 2004/0225574 A1 | 11/2004 | Arnold et al. |
| 2004/0230536 A1 | 11/2004 | Fung et al. |
| 2004/0230601 A1 | 11/2004 | Joao et al. |
| 2004/0243690 A1 | 12/2004 | Hancock et al. |
| 2004/0254808 A1 | 12/2004 | Bennett et al. |
| 2004/0260634 A1 | 12/2004 | King et al. |
| 2005/0015332 A1 | 1/2005 | Chen |
| 2005/0021363 A1 | 1/2005 | Stimson et al. |
| 2005/0021527 A1 | 1/2005 | Zhang et al. |
| 2005/0027613 A1 | 2/2005 | Takekuma et al. |
| 2005/0027651 A1 | 2/2005 | DeVault et al. |
| 2005/0033660 A1 | 2/2005 | Solomon |
| 2005/0033760 A1 | 2/2005 | Fuller et al. |
| 2005/0055306 A1 | 3/2005 | Miller et al. |
| 2005/0075964 A1 | 4/2005 | Quinn et al. |
| 2005/0119980 A1 | 6/2005 | Kohavi et al. |
| 2005/0125260 A1 | 6/2005 | Green et al. |
| 2005/0131839 A1* | 6/2005 | Cordery et al. ................. 705/78 |
| 2005/0137947 A1 | 6/2005 | Schaub et al. |
| 2005/0149378 A1 | 7/2005 | Cyr et al. |
| 2005/0165699 A1 | 7/2005 | Hahn-Carlson |
| 2005/0177435 A1 | 8/2005 | Lidow et al. |
| 2005/0177507 A1 | 8/2005 | Bandych et al. |
| 2005/0192896 A1 | 9/2005 | Hutchison et al. |
| 2005/0216368 A1 | 9/2005 | Wechsel |
| 2005/0234820 A1 | 10/2005 | MacKouse |
| 2005/0240592 A1 | 10/2005 | Mamou et al. |
| 2005/0246192 A1 | 11/2005 | Jauffred et al. |
| 2005/0251478 A1 | 11/2005 | Yanavi |
| 2005/0256802 A1 | 11/2005 | Ammermann et al. |
| 2005/0274792 A1 | 12/2005 | Hahn-Carlson et al. |
| 2005/0278220 A1 | 12/2005 | Hahn-Carlson et al. |
| 2005/0278221 A1 | 12/2005 | Hahn-Carlson et al. |
| 2005/0278244 A1 | 12/2005 | Yuan |
| 2005/0278251 A1 | 12/2005 | Hahn-Carlson |
| 2005/0278255 A1 | 12/2005 | Hahn-Carlson et al. |
| 2005/0283434 A1 | 12/2005 | Hahn-Carlson et al. |
| 2005/0283437 A1 | 12/2005 | McRae et al. |
| 2005/0289023 A1 | 12/2005 | Hahn-Carlson et al. |
| 2005/0289024 A1 | 12/2005 | Hahn-Carlson |
| 2006/0004670 A1 | 1/2006 | McKenney et al. |
| 2006/0010058 A1 | 1/2006 | D'Hers et al. |
| 2006/0015454 A1 | 1/2006 | Hahn-Carlson |
| 2006/0036476 A1 | 2/2006 | Klem |
| 2006/0116957 A1 | 6/2006 | May et al. |
| 2006/0167762 A1 | 7/2006 | Hahn-Carlson |
| 2006/0167791 A1 | 7/2006 | Hahn-Carlson |
| 2006/0167792 A1 | 7/2006 | Hahn-Carlson |
| 2006/0233334 A1 | 10/2006 | Bingaman et al. |
| 2006/0287953 A1 | 12/2006 | Chauhan |
| 2007/0022021 A1 | 1/2007 | Walker et al. |
| 2007/0055582 A1 | 3/2007 | Hahn-Carlson |
| 2007/0136278 A1 | 6/2007 | Grazioli et al. |
| 2007/0156584 A1 | 7/2007 | Barnes et al. |
| 2007/0192178 A1 | 8/2007 | Fung et al. |
| 2007/0208635 A1 | 9/2007 | Van Luchene et al. |
| 2007/0214065 A1 | 9/2007 | Kahlon et al. |
| 2007/0214077 A1 | 9/2007 | Barnes et al. |
| 2007/0246528 A1 | 10/2007 | Kubo et al. |
| 2007/0262140 A1 | 11/2007 | Long |
| 2007/0271160 A1 | 11/2007 | Stone et al. |
| 2007/0282724 A1 | 12/2007 | Barnes et al. |
| 2007/0282744 A1 | 12/2007 | Barnes et al. |
| 2007/0299769 A1 | 12/2007 | Fowler et al. |
| 2008/0082374 A1 | 4/2008 | Kennis et al. |
| 2008/0103972 A1 | 5/2008 | Lanc |
| 2008/0172314 A1 | 7/2008 | Hahn-Carlson |
| 2008/0215456 A1 | 9/2008 | West et al. |
| 2008/0249940 A1 | 10/2008 | Hahn-Carlson et al. |
| 2009/0171727 A1 | 7/2009 | Hahn-Carlson |
| 2009/0192922 A1 | 7/2009 | Hahn-Carlson |
| 2009/0259576 A1 | 10/2009 | Hahn-Carlson |
| 2009/0265274 A1 | 10/2009 | Hahn-Carlson et al. |
| 2009/0287590 A1 | 11/2009 | Hahn-Carlson |
| 2009/0287598 A1 | 11/2009 | Hahn-Carlson |
| 2009/0292630 A1 | 11/2009 | Hahn-Carlson et al. |
| 2009/0307114 A1 | 12/2009 | Hahn-Carlson |
| 2010/0017315 A1 | 1/2010 | Hahn-Carlson |
| 2010/0049650 A1 | 2/2010 | Keaton et al. |
| 2010/0070397 A1 | 3/2010 | Hahn-Carlson et al. |
| 2010/0138325 A1 | 6/2010 | Hahn-Carlson |
| 2010/0185540 A1 | 7/2010 | Hahn-Carlson et al. |
| 2010/0205054 A1 | 8/2010 | Hahn-Carlson et al. |
| 2011/0004544 A1 | 1/2011 | Baum |
| 2011/0029404 A1 | 2/2011 | Hahn-Carlson et al. |
| 2012/0158558 A1 | 6/2012 | Hahn-Carlson et al. |

FOREIGN PATENT DOCUMENTS

| | | |
|---|---|---|
| EP | 0425421 A2 | 5/1991 |
| EP | 0779587 A2 | 6/1997 |
| FR | 2543327 A1 | 9/1984 |
| GB | 2398894 A | 9/2004 |
| JP | 2001312680 A | 11/2001 |

(56) References Cited

FOREIGN PATENT DOCUMENTS

| WO | WO 97/07468 A1 | 2/1997 |
|----|----|----|
| WO | WO 99/08218 A1 | 2/1999 |
| WO | WO 00/62225 A1 | 10/2000 |
| WO | WO 01/09782 A2 | 2/2001 |
| WO | WO 01/26017 A2 | 5/2001 |
| WO | WO 01/35570 A1 | 5/2001 |
| WO | WO 01/48659 A1 | 5/2001 |
| WO | WO 01/09782 | 8/2001 |
| WO | WO 01/82193 A1 | 11/2001 |
| WO | WO 01/88813 A1 | 11/2001 |
| WO | WO 02/21405 A1 | 3/2002 |
| WO | WO 02/006920 A2 | 9/2002 |
| WO | WO 2005/124635 A2 | 12/2005 |
| WO | WO 2006/071881 A2 | 7/2006 |
| WO | WO 2008/045793 A1 | 4/2008 |

OTHER PUBLICATIONS

South China Morning Post, Hong Kong, Buying "Products over the Net," Jul. 2000, 2 pp.
Xcitek Press Release, "U.S. Bank Selects Xcitek for Corporate Actions Data and XSP for Corporate Actions Automation," NY, NY, Dec. 2003, 1 pp.
Berhad, "Fueling financial oil for the economy," The New Straits Times Press (Malaysia), Dec. 10, 2001, 3 pp.
Singh, "A new road to recovery," Risk, pp. 108-110, Sep. 2004.
"Credit Derivatives and Mortgage-backed Bonds in Capital Adequacy Requirements for Market Risk," http://www.rahoitustarkastus.fi/Eng/Regulation/FSA_standards/FSA_interpretations/4_2005.html, Apr. 2005, 5 pp.
Fletcher, "Limits on reinsurance offsets sought by California regulator," Business Insurance, May 8, 1995 4 pp.
Denver Business Wire, "JD Edwards Continues to drive network-centric applications delivery with OneWorld enhancements," Jun. 16, 1997, p. 06160089.
Notice from the European Patent Office concerning business methods, dated Oct. 1, 2007, 2 pp.
Egan, "Administrative Orders from the Office of the Governer of Alaska," Jul. 18, 1972, 3 pp. http://www.gov.state.ak.us/admin-orders/018.html.
Bodnar, "Estimating Exchange Rate Exposure: Issues in Model Structure," Financial Management v32, n1, pp. 35-67, 2003.
Plewka, "Germany seizes the Emu initiative," International Tax Review, v8, n5, pp. 43-46, May 1997.
Huang, "Exchange Risk and Exchange Rate Pass-Through," v67/02-A of Dissertation Abstracts International, 2005.
Brochure: mySAP™ Supplier Relationship Management—At a Glance, SAP®, 2003, 16 pp.
Brochure: Self-Service Procurement: Slashing Costs and Saving Time, SAP®, 2003, 12 pp.
McKeefry, "Seeking microcontrollers desperately," Electronic Buyers News, n972, Sep. 11, 1995, 6 pp.
Mallory, Great Plains Accounting v.7 (Great Plains Software's accounting software) (Product Accouncement), Apr. 22, 1993, 3 pp.
Russell, "Kitting out is now in (Use of component kits is expanding as distributors develop added-value activities)," Electronic Times (online), n 852, Apr. 17, 1997, 4 pp.
Notification of Second Office Action from corresponding Chinese Patent Application No. 200780043629.2, mailed Jan. 13, 2012, 3 pp.
Electronic Commerce News, Sarbanes-Oxley Continues to be Key Issue in Corporate Payments Space, Sep. 1, 2003, vol. 8, issue 18, Publisher: Phillips Business Information, 7 pp.
JIT systems and external logistics suppliers—Michael S. Spencer, Dale S. Rogers, Patricia J. Daugherty, International Journal of Operations & Production Management, v14n6, pp. 60-74, 1994 (Includes Charts Appendix References).
Iinternational Preliminary Report on Patentability from international application No. PCT/US07/80567, dated Jul. 8, 2009, 6 pp.
U.S. Appl. No. 09/527,717, by Dean Hahn-Carlson, filed Mar. 17, 2000.

* cited by examiner

TRANSACTION FINANCE PROCESSING SYSTEM AND APPROACH

RELATED PATENT DOCUMENTS

This patent document claims the benefit, under 35 U.S.C. §119(e), of U.S. Provisional Patent Application No. 60/849,920 filed on Oct. 6, 2006 and entitled: "Transaction Finance Processing System and Approach," which is fully incorporated herein by reference.

FIELD OF THE INVENTION

The present invention is directed to communications and data processing and, more specifically, to communications and data processing involving the processing of financial aspects of financial transactions.

BACKGROUND

Operational management of contractual and transactional interactions between buyers, sellers, financial institutions and others involved in the exchange of merchant offerings (e.g., products and/or services) for purposes of commerce have typically been labor and time intensive. Generally, the management of transactions between business entities has been unduly burdensome and inefficient.

Traditional financial processing of the payment aspect of transactions typically involves a buying entity processing invoices or other payment request information received from sellers. Based upon review and acceptance of the invoices, the buying entity generates a payment or payments in one or more of a variety of forms and delivers that payment and associated cash application detail to the seller or sellers at a time and in a manner convenient to the buyer's business practices.

Conventional payment processes have been generally time consuming and have introduced significant operational complexity. For example, a buyer typically engages in contracts with a multitude of different sellers, with each seller generally submitting invoice data in different forms and requiring different payment terms and/or processes. Payment processing has thus typically involved a multitude of different functions that are performed at different times. For instance, payment request information such as that typically presented in an invoice has to be received and processed. Often, invoice processing involves several steps, including the performance of an evaluation of the transaction to ensure that the payment should be made in accordance with the invoice, coding the invoice so that the expense is accounted for correctly in the buyer's financial books of record, approval of the invoice and, upon approval, payment of the invoice. Further, cash flow issues for the buying entity may drive particular payment processing functions/approaches, such as those involving an extension in payment date and any corresponding fees assessed by a seller or sellers involved in the payment date change. In addition, cash flow issues for the selling entity may drive particular cash collection functions/approaches, such as those involving selling the receivable for cash at a discount in advance of receipt of the funds from the buyer and any corresponding fees and recourse requirements enforced on the seller by the entity purchasing the receivable.

Many transactions also involve a variety of parties at different levels of payment hierarchy. For example, when an intermediary seller party sells a product or service to a buying party, the intermediary seller party often sources (i.e., purchases) some or all of the product or service from a performing seller party (e.g., a supplier). The performing seller party performs according to a contract with the intermediary seller party, with the goods and/or services being tendered upon the buying party either directly or indirectly. The intermediary seller party invoices the buying party for the transaction, who pays the intermediary seller party according to terms of a contracted price between the buying and intermediary seller parties. The performing seller party invoices the intermediary seller party for the transaction via a completely distinct and non-related process. The intermediary seller then pays the performing seller according to terms of a contracted price between the intermediary seller and performing seller parties via a process that is completely distinct and non-related to the process whereby the buyer is paying the intermediary seller.

In the above examples, various invoices and related activities (accounting, extension of trade credit, adjustments, etc.) are required for each contract and, where applicable, in the chain of contracts between buyer, intermediary and selling parties. These activities are time consuming, subject to error and often duplicative or conflicting in nature because the different parties are working from different and incomplete versions of information regarding the same transaction. For example, the buying party may either seek financing to pay the supplier without having to come up with the cash immediately or may decide to simply delay payment to the intermediary party to avoid having to come up with the cash immediately. The intermediary party may either seek to accelerate receipt of payment through offering inducements in the form of a discount to the buyer or may sell the receivable to a third party at a discount in return for receiving cash now instead of when the buyer finally remits payment. The intermediary party is in the same position as the buyer relative to the intermediary's interaction with the performing seller. Finally, the performing seller is in the same position as the intermediary party relative to seeking to accelerate its receipt of cash. All of these financing steps may be performed through different financial institutions, each of which is only in possession of some of the information about the transaction and this limited information leads to calculation of a higher cost of funding than if all information was available. These interactions typically involve complex agreements and associations that facilitate the transfer of funds. At times, there can be delays in payment or disputes regarding terms of payment. In addition, this process is highly susceptible to error. Interaction complexity, delay, error and a multitude of other transaction payment characteristics can cost one or more parties to a transaction a significant amount of funds.

Most industries are quite competitive and any cost savings are therefore important. Administrative costs are targeted for reduction as no revenue is directly generated from administrative functions. However, administrative costs associated with commercial transactions have been difficult to reduce in the current business environment with widely diffused data.

The above and other difficulties in the management and coordination of transactions have presented administrative and cost challenges to business entities involved in various aspects of transactions. In particular, the management of payment functions between buyer and seller entities has presented operational, organizational and cost challenges. As the interacting buyer and seller entities operate on multiple organization levels, e.g., disparate branch locations, subsidiaries and others, these challenges are further exasperated. Further, as transactions become more complex, involving multiple parties in multiple countries in a chain of payment, managing and implementing payment functions becomes even more challenging.

SUMMARY

The present invention is directed to overcoming the above-mentioned challenges and others related to the types of devices and applications discussed above and in other applications. The present invention is exemplified in a number of implementations and applications, some of which are summarized below.

According to an example embodiment of the present invention, payment is effected on behalf of an owing party to owed parties as a function of information provided by the owing party in connection with transactions between the owing party and the owed parties. Generally, such an embodiment is relevant to accounts payable processing for owing parties.

According to another example embodiment of the present invention, payment is effected to an owed party as a function of information provided by the owed party in connection with transactions between the owed party and approved owing parties. Generally, such an embodiment is relevant to accounts receivable processing for owed parties.

According to another example embodiment of the present invention, an automated payment processing arrangement processes for transactions involving different buyers and sellers. The arrangement includes a transaction processor (e.g., one or more processors in an arrangement) that associates seller invoices with a particular transaction involving a buyer and a seller as a function of stored contract information defining a specific contract between the buyer and the seller. For each associated invoice, the processor audits the invoice as a function of stored contract information provided by one of the buyer and the seller and facilitates a credit-based payment to the seller on behalf of the buyer using the invoice audit and the stored contract information for at least one of the buyer and the seller. A record of seller payments made on behalf of a buyer is maintained.

For each transaction, the transaction processor effects (e.g., processes) a funds transfer for collecting reimbursement from the buyer (e.g., settlement) for the payments provided to sellers on behalf of the buyer. A fee is selectively assessed against each buyer as a function of the payments made on behalf of the buyer, and against each seller as a function of funding and collection performed on behalf of that seller. In this context, selectively assessing a fee may include assessing no fee, assessing a fee to one of the buyer and seller, assessing a fee to both the buyer and seller and, in some applications, assessing a fee that includes both transaction fees and fees for the extension of credit (e.g., interest).

According to another example embodiment of the present invention, an automated transaction processor is adapted for facilitating payment processing for a buyer entity. The buyer entity provides transaction information to the processor to facilitate payment to owed parties with whom the buyer entity engages in transactions. The transaction information generally includes sufficient financial information for each owed party (e.g., owed party identity, payment amount, payment address, payment date, financial account to debit) to enable the processor to make payment to the owed party. The processor processes payment to each owed party on behalf of the buyer entity and in accordance with the transaction information. The processor further facilitates a credit function for tracking the payments made on behalf of the buyer and for assessing a fee to the buyer for the processing service and/or for the extension of credit.

According to another example embodiment of the present invention, an automated transaction processor is adapted for facilitating accelerated payment for a seller entity (owed party). The seller entity provides transaction information to the processor to facilitate accelerated receipt of funds from a financing entity that provides the funds on behalf of an owing party for the transaction. The transaction information generally includes sufficient financial information for each owing party (e.g., owing party identity, owing amount, payment address, payment due date, financial account to credit) to enable the processor to make payment to the owed party (from a financing entity), and to enable each financing entity to collect from an appropriate owing party. The processor processes payment to each owed party in accordance with the transaction information and the financing agreement between the seller and the processor. The processor further facilitates a collection function for tracking the payments due from each owing party (e.g., each buyer) for invoices purchased from each owed party (sellers) and for assessing a fee to each seller for the processing service and/or for the extension of credit. In some applications, the financial institution collects directly from an owing party; in other applications, the financial institution collects from an owed party to which early payment has been made, when that owed party receives payment from an appropriate owing party.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1:
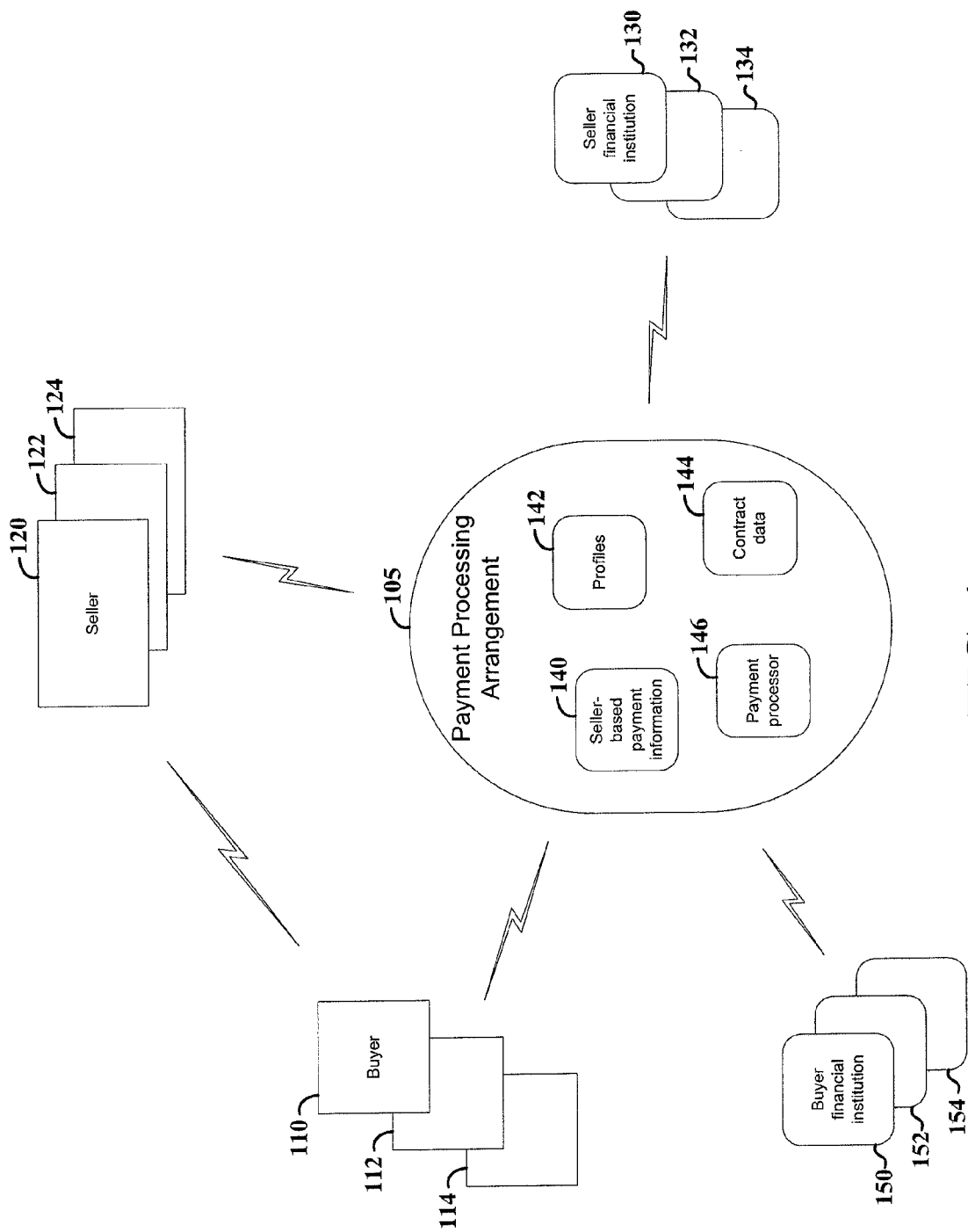
FIG. 1 shows a transaction processing arrangement and approach, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of communications and financial process management approaches, and has been found to be particularly useful for applications involving the implementation and application of payment-related transaction processes and aspects thereof. While the present invention is not necessarily limited to such approaches, various aspects of the invention may be appreciated through a discussion of various examples using these and other contexts.

According to an example embodiment of the present invention, a payment management approach involves managing and processing payment aspects of transactions on behalf of buyers that contract with sellers providing merchant offerings (e.g., goods and/or services) under terms of contracts with the buyers. Profile information is stored for each buyer and used in processing payment on behalf of each buyer. The buyers also provide contract information to a payment processor including data detailing contract-related terms such as payment date, auditing data (e.g., data for use in ensuring contract performance, such as applying the correct pricing, before making payment), seller information and more.

When an invoice is received from a seller, the payment processor audits the invoice to assess whether the invoice is in accordance with the stored contract information and/or with profile information for a buyer or seller. Information in the invoice (e.g., a transaction ID or seller ID) is compared with stored contract data and/or profile data. If information in the invoice does not match available contract and/or profile information, an error message can be sent to the seller issuing the invoice and/or to a buyer entity from which the payment is requested. If information in the invoice matches contract and/or profile data, the invoice is accordingly associated with stored contract data.

Associated invoices are audited using the stored contract information to ensure that payment to the seller providing the invoice is proper and, further, to determine the manner in which payment is to be made. Accordingly, the manner in which funds from the buyer are to be ascertained is also determined. Stored contract information that is used for auditing the invoice may include, for example, information for ensuring that payment to the seller is proper or that the amount and/or other terms in the invoice are proper. For instance, an audit may involve checking stored contract information to ensure that the seller has fulfilled its contractual duties, wherein the buyer provides feedback for storing with the contract information that indicates a condition of acceptance of merchant offerings for which the seller is providing the invoice. The audit may also involve checking the quantity, price, unit of measure, description or other characteristics on the invoice to ensure that these characteristics match the contract data or, in instances where variances are allowed (i.e., as set forth in contract and/or profile data), that any variance is within a specified range of variance.

Once payment is approved via the audit, the manner in which payment is to be made is characterized using the contract data and/or profile information for the buyer and/or seller involved in the transaction. For example, contract data may specify rules by which payment is to be made to the seller, such as rules relative to a time of payment, method of payment (e.g., paper, credit or electronic transfer), place of payment (e.g., to the seller or the seller's financial institution) and in connection with any associated fees. Profile information may specify a condition of payment, such as a time, method or place as discussed above wherein, e.g., these transaction characteristics specify a range of options for these conditions.

Payments made on behalf of a buyer are tracked for subsequent collection from the buyer in various contexts. In some embodiments, payments made to sellers are effected as a receivables purchase. That is, a buyer's sponsoring (or other) bank purchases unpaid invoices (i.e., "trade receivables") from sellers with whom a particular buyer transacts for goods and/or services. The seller is paid for the receivables, at times for an amount that is less than an actual owed amount by the buyer (e.g., relative to a discount, fee or early payment incentive), which effectively completes the original transaction between the buyer and seller from the seller's perspective. The bank tracks such receivables purchases and stores them as trade receivables that are collectable from the buyer. In this context, the buyer may not be made aware that the seller has already received payment for an invoice that the buyer still regards as an open payable (i.e., "trade payables") or that the "pay to" address on the invoice actually references a lockbox or other receivable mechanism (physical or otherwise) managed by a sponsoring bank.

In one example embodiment, transaction processing functions, such as those discussed above, are carried out without necessarily directly involving a seller party. For instance, a buyer may specify (e.g., in profile information) that a seller with which the buyer is contracting provide invoices to a particular location at which payment processing is carried out. When submitted electronically, the invoices can be forwarded or directly sent to the payment processor. The seller is paid accordingly, without necessarily interacting with the payment processor and, in some applications, essentially blind to the circumstance that the invoices are not directly sent to the buyer or that payment is not directly provided by the buyer.

In another example embodiment, transaction processing functions, such as those described above, are carried out without necessarily directly involving a buyer party. For instance, a seller may specify (e.g., in profile information) that a buyer to which the seller is providing goods and/or services make payment in a particular manner or to a particular entity such as a third party financial institution that expedites payment to the seller. The seller receives payment from the financial institution in advance (or regardless) of the buyer's payment. This approach may be carried out such that the buyer is essentially blind to the circumstance that payment to the seller is made by a third party financial institution, with the buyer paying in accordance with terms set between the buyer and seller (e.g., such buyer payment is settlement for a particular amount owed by the buyer, which may occur independently from any payment made to a seller). In some applications, this approach facilitates a trade receivables purchase, such that the third party financial institution effectively purchases receivables from sellers (with immediate payment to such sellers, e.g., in an amount owed to the seller less a fee), and collects from buyers owing for the receivables.

The profile information discussed above generally includes information that is used in processing transactions on behalf of and/or involving a transaction party, and may include a variety of information, depending upon the application. For example, financial institution data and account data that can be used in effecting payment, credit issuance information reflecting credit agreements between a buyer or seller and a financial institution and/or transaction processing entity (i.e., for issuing trade credit), or other information relative to each buyer's relationship with the transaction processing arrangement can be stored with the profile information. In some instances, the profile information is used in facilitating buyer access to stored data. In other instances, the profile information also includes seller profile information for use in identifying sellers with which buyers contract and to whom payment can be made. In this regard, the above-discussed auditing approach for matching the invoice with contract data may further include ensuring that the seller providing the invoice has stored profile information that indicates the seller's propriety in participating in the contract (and, correspondingly, being paid for the invoice).

In still other applications, accounts payable functions for a particular buyer are carried out on behalf of the buyer and subsidiaries of the buyer, for different transactions involving the different subsidiaries and sellers contracting with the subsidiaries. For instance, where a parent company A, having subsidiaries B and C, participates in such an accounts payable (e.g., trade credit) approach, sellers are paid on behalf of the subsidiaries B and C, the payments are tracked and assessed against the parent company A, together with any fees such as interest or processing fees. In this regard, payments from different subsidiaries to different sellers are facilitated in a manner that is amenable to tracking, management and control by the parent company A. In some applications, a single funds transfer from parent company A can be made at a set time (e.g., periodically, such as monthly) to cover a multitude of payments made on behalf of subsidiaries B and C.

Turning now to the figures, FIG. 1 shows an accounts payable payment processing arrangement and approach, according to another example embodiment of the present invention. A payment processing arrangement 105, which is remote from the buyer, the seller and the sponsoring bank, manages payment for transactions between buying parties and parties that provide goods and/or services (e.g., merchant offerings) for which the buying parties make payment. A payment processor 146 uses seller-based payment information 140, profiles 142 and contract data 144 in processing payment to sellers on behalf of buyers. A plurality of transaction parties including buyer parties 110-114 and seller parties 120-124 are shown by way of example. While certain buyer and seller parties are shown, this example embodiment and its related approaches are applicable to a multitude of such parties, as well as to additional types of transactional parties, which may be implemented for a variety of situations. For instance, as described above, payment can be facilitated for subsidiary buyers of a parent buyer company, with funds collected for the payment from the parent and/or subsidiary buyers.

In addition to the parties immediately taking part in the transactions, the payment processing arrangement 105 also interacts with financial institutions or the profiles these institutions maintain within the payment processing arrangement by which funds are provided (or received) for transactions processed by the payment processing arrangement. In this regard, buyer financial institutions 150-154 and seller financial institutions 130-134 are also shown by way of example.

The seller-based payment information 140 is stored for access by the payment processing arrangement 105 (e.g., either at the payment processing arrangement or at a remote accessible location, such as a buyer node or another database). The seller-based payment information 140 generally includes a listing of authorized sellers for whom invoices may be processed on behalf of each buyer. In addition, the seller-based payment information 140 may include seller-specific payment terms by which the payment processing arrangement 105 processes payment on behalf of each particular buyer.

The profiles 142 are stored for each buyer 110-114 for use by the payment processing arrangement 105 in processing payment on behalf of each buyer. These profiles 142 generally include information for identifying and communicating with each buyer and use information regarding each buyer's use of the payment processing arrangement 105.

The payment processing arrangement 105 processes payment for transactions in accordance with the profile data stored in the profiles 142. The profile data stored with the profiles 142 typically defines payment processing characteristics and rules such as credit limits, payment processing fees, credit extension characteristics (e.g., credit rate and/or term involved with trade credit) and other buyer-specific terms. In some instances, the profile data defines processing rules by which buyers can approve invoices from sellers for payment, or conditions upon which automatic approval can be carried out by the payment processing arrangement 105.

The payment information in the profiles 142 generally includes information sufficient for processing payment on behalf of each buyer. For instance, the payment information may identify a financial institution or institutions from which each buyer will provide funds, as well as any associated authorization needed for accessing the funds from the identified financial institution or institutions. The payment information further identifies a time for funds withdrawal, or a function for use in determining a time at which to withdraw funds, from each buyer's financial institution to cover payments made to sellers. In this regard, the use information discussed above as related to credit extension characteristics can be implemented with the payment information for assessing fees for credit extended during a time between making a payment to a seller and withdrawing funds for the payment from the buyer's financial institution.

The contract data 144 is also stored and implemented by the payment processing arrangement 105 for processing payment on behalf of each buyer. The contract data 144 specifies characteristics of agreements between buyers and sellers and sets forth terms relating to payment and, in some instances, other aspects of transactions. For example, where buyer 110 contracts for goods with seller 120, a corresponding contract may specify terms by which the seller 120 is to be paid or by which the buyer 110 is to accept (or decline) goods and other contractual terms as typically implemented in connection with payment processing. The payment terms may, for example, indicate a period or other time characteristic to be used in making payment (e.g., immediately, 30, 60 or 90 days) to the seller 120 on behalf of the buyer 110. The payment terms may also indicate a fee or a credit, based on the time of payment (e.g., where a seller offers a credit for early payment and/or assesses a fee for a late payment, with early and late timing specified in the contract data 144).

Funds for each transaction are provided by one or more of the buyer financial institutions on behalf of a particular buyer (e.g., to effect settlement), either at the time of the payment for the transaction or at another time as contracted by each buyer. For example, where a buyer delays its payment for transactions and/or pays for all transactions on a cyclic or other periodic time period, funds are provided by the one or more buyer financial institutions for a multitude (if applicable) of payments made on behalf of the buyer.

In one specific example, buyer 110 makes purchases from sellers 120, 122 and 124. Each seller invoices the buyer 110 during a particular billing cycle and the invoices are communicated, either directly or via the buyer, to the payment processing arrangement 105. The invoices are audited to ensure that the invoices are payable, either by the buyer 110 or by the payment processing arrangement 105 (in accordance with profiles 142 and/or contract data 144 for the buyer 110). Funds for the invoices are provided on behalf of the buyer 110 to the respective sellers (e.g., to one of the seller financial institutions 130-134) via the payment processing arrangement 105 in accordance with payment terms in the contract data 144 for the buyer 110 and the sellers.

The payment processing arrangement 105 records the paid invoices to generate a credit record for the buyer 110. At the end of a transaction period, the payment processing arrangement assesses funds against the buyer in accordance with the credit record. The payment processing period is generally set in accordance with an agreement between the buyer 110 and an entity operating the payment processing arrangement 105 (or otherwise extending the credit) and stored in the profiles 142 for the buyer. Funds are withdrawn on behalf of the buyer 110 from one or more buyer financial institutions 150-154 in accordance with the profiles 142 for the buyer (e.g., at the end of the transaction period) to effect electronic settlement from the buyer.

In some implementations, the buyer 110 maintains a credit record, without necessarily providing funds at the end of a particular transaction period, with the payment processing arrangement assessing credit fees against the buyer and holding some or all of the funds in the credit record over into a subsequent transaction period. In such other applications, the amount of funds held over may be subject to a particular credit limit established for the buyer 110 (e.g., as stored on behalf of the buyer in the profiles 142). Such a credit limit may also be implemented in connection with a total amount of credit that the payment processing arrangement 105 extends to the buyer 110 for use in paying invoices during a particular transaction period and/or over the course of several transaction periods (where the credit record is held over into a subsequent transaction period).

In connection with another example embodiment, the payment processing arrangement 105 is adapted to enable access to transaction information for parties to the transaction as a function of user profiles. In one example, where a buyer 110 contracts with an entity operating the payment processing arrangement 105 for processing accounts payable functions, the buyer is given a user name and password, which are stored in the profiles 142 and allow the buyer to access information at the payment processing arrangement. This information may include, for example, the seller-based payment information 140, profiles 142 or contract data 144. In addition, status information such as that relating to invoices paid to sellers 120-124, a credit balance relating to such invoices and others is also optionally made available to the buyer 110.

In some applications, the buyer 110 is allowed access to the payment processing arrangement 105 for interacting with information used in processing payment. For instance, invoices provided to the payment processing arrangement 105 from the sellers 120-124 can be stored and subsequently accessed by the buyer 110 for approval. In this regard, the buyer 110 can interact to provide payment approval to the payment processor 146, which in turns effects payment on behalf of the buyer to the seller that is the subject of the approval. Other buyer interactions may include, for example, a selection of payment terms such as whether to pay off funds assessed against the buyer 110 in a credit record relative to invoices paid on behalf of the buyer, or to allow the funds assessed to remain in the credit record (and, e.g., incur fees associated with the credit extension).

In another example embodiment, a transaction processing approach involves paying sellers on behalf of buyers for transactions involving different buyers and sellers having respective contracts therebetween, with collection from buyers for a payment (or a group of payments as trade payables) as follows. A transaction processor associates electronic seller invoice data sets with data characterizing a particular transaction involving a buyer and a seller as a function of stored contract data. For each associated invoice data set, the transaction processor audits the invoice data set using electronically-stored contract information for one of the buyer and the seller and generates audit result data in response to the audit. The transaction processor makes an electronic credit-based payment to an electronic financial system for the seller on behalf of the buyer using the audit result data and stored contract data for at least one of the buyer and the seller. For transactions involving a particular buyer, the transaction processor maintains record data of seller payments made on behalf of the buyer, and processes an electronic funds transfer for collecting electronic settlement from the buyer for electronic payments provided to sellers on behalf of the buyer. The transaction processor selectively assesses fees to one or both of a buyer and seller for transactions as follows, in accordance with one or more processing approaches, contracts between buyers and sellers, profile data and/or contracts between an operator of the transaction processor and a buyer and/or seller. A fee is selectively assessed against each buyer by generating computer-readable fee data for electronic payment made on behalf of the buyer, the fee data electronically associating the assessed fee and an amount of the fee with the buyer. A fee is selectively assessed against each seller by generating computer-readable fee data for credit-based funding and electronic payment collection performed on behalf of the seller, the fee data electronically associating the assessed fee and an amount of the fee with the seller. This approach may be carried out, for example, using an arrangement similar to that described above with FIG. 1, or that described below with the remaining figures, such as the approaches described with FIG. 4 and/or FIG. 5.

Figure 2:
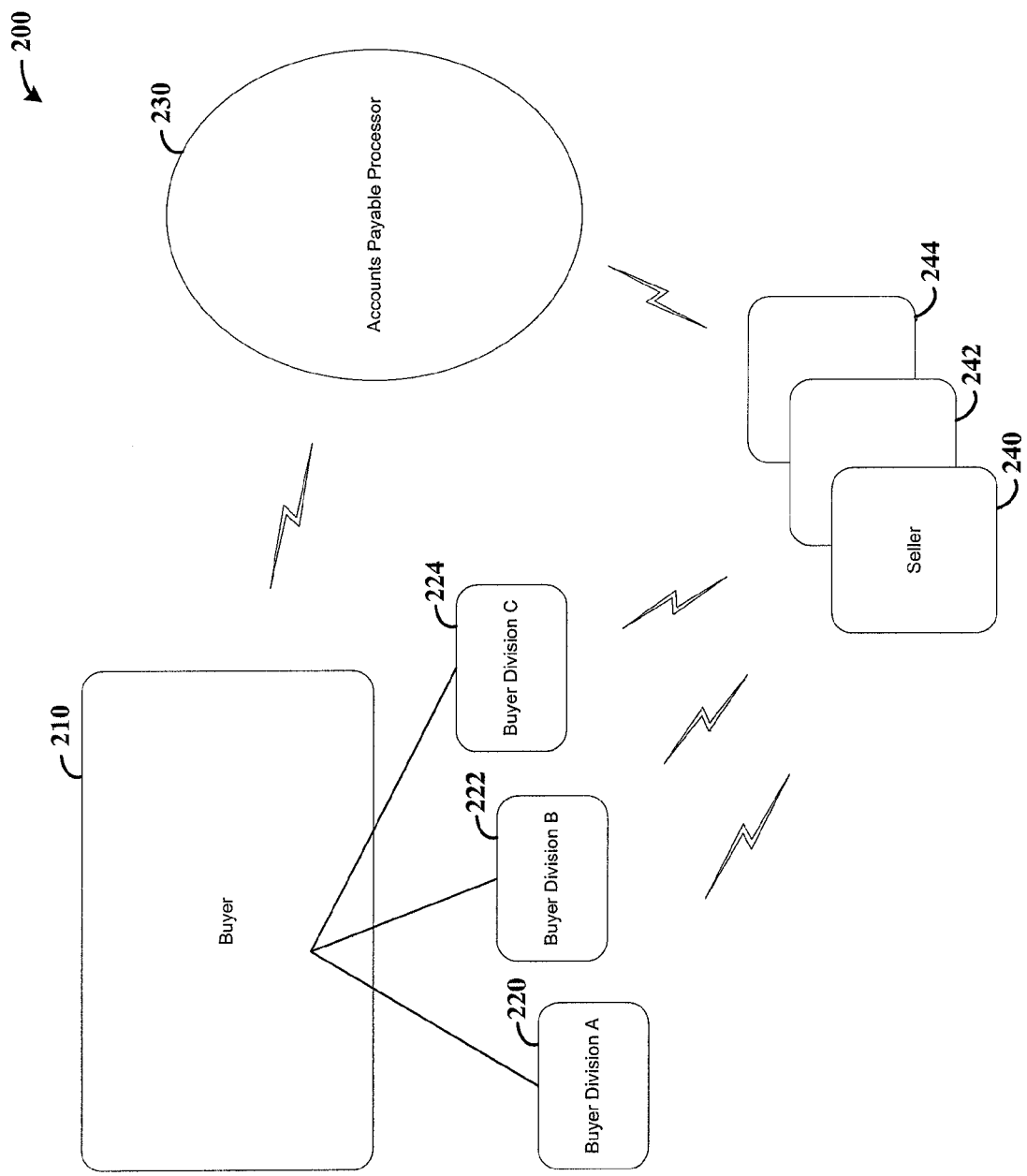
FIG. 2 shows a payment processing arrangement and approach involving a multi-tiered buyer entity, according to an example embodiment of the present invention.

FIG. 2 shows an accounts payables processing arrangement and approach 200, according to another example embodiment of the present invention. An accounts payable processor 230, which is remote from both the buyer and the sellers, facilitates accounts payable on behalf and at the direction of a buyer entity 210 and divisions of the buyer company, including divisions A (220) B (222) and C (224), which may each be using different computer systems to manage their business activities, with additional divisions optionally implemented and these three shown by way of example. Accounts payables are managed in connection with a multitude of sellers with which the buyer divisions 220-224 and/or the buyer entity 210 interact for merchant offerings (e.g., goods and/or services).

The accounts payable processor 230 operates, in various implementations, in a manner similar to that discussed above in connection with the payment processing arrangement 105 in FIG. 1. In this regard, the accounts payable processor 230 generally includes and/or accesses contract, profile, seller and other information useful in processing payment on behalf of the buyer entity 210 and buyer divisions 220-224.

The buyer entity 210 sets payment and terms by which the accounts payable processor 230 processes payment on behalf of the buyer divisions 220-224. Further, the accounts payable processor 230 facilitates access by the buyer entity 210 to accounts payable information relating to transactions between the buyer divisions 220-224 and the sellers 240-244. Payment for the transactions is effected via financial and payment information provided by the buyer entity 210 for transactions involving the buyer divisions 220-224, in a manner similar to that discussed above.

In this regard, the accounts payable processor 230 facilitates timely payment to the sellers 240-244 on behalf of the buyer entity 210 and buyer divisions 220-224. The accounts payable processor 230 tracks payments made to the sellers 240-244 against a credit account for the buyer entity 210 and further referencing the buyer division involved in each payment. The accounts payable processor extends credit for these payments to the buyer entity 210 (and, accordingly, to the buyer divisions 220-224) in accordance with profile information for the buyer entity and, in some instances, for the buyer divisions. At the end of a transaction period or at another particular time, the accounts payable processor 230 processes a funds transfer from the buyer entity 210 (i.e., from the buyer entity's financial institution) to cover payments made to the sellers 240-244. Thus, the accounts payable processor 230 makes timely payments to the sellers 240-244 on behalf of the buyer entity 210 and its divisions 220-224 and assesses a periodic (e.g., single) payment from the buyer entity to cover all of the payments made, simplifying payment from and extending trade credit to the buyer entity.

Figure 3:
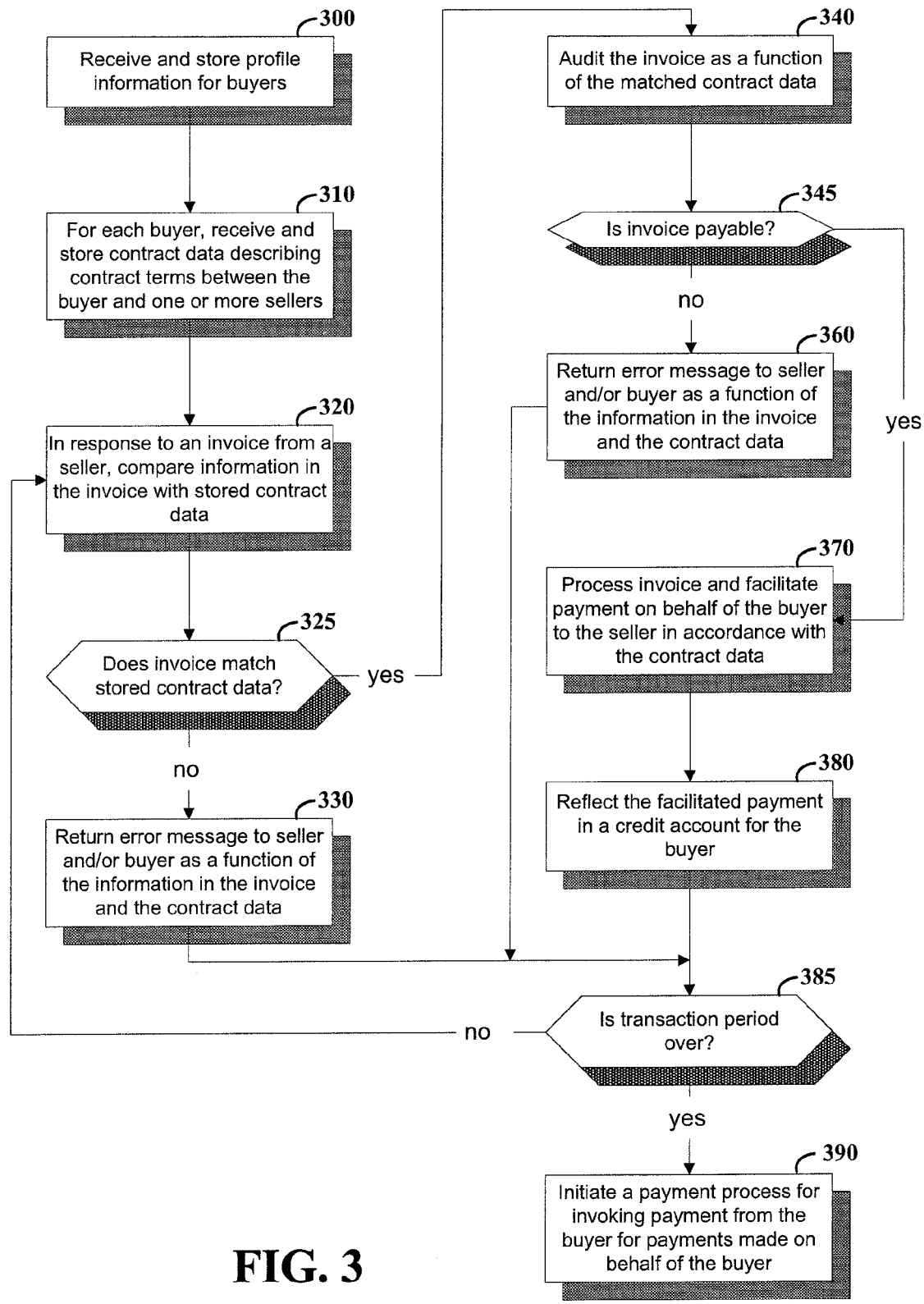
FIG. 3 shows a flow diagram for transaction processing, according to another example embodiment of the present invention.

FIG. 3 is a flow diagram for a method for processing transactions involving buyers and sellers, according to another example embodiment of the present invention. This approach may be implemented using, for example, the payment processing arrangement 105 discussed in connection with FIG. 1 and/or the accounts payable processor 230 discussed in connection with FIG. 3. At block 300, buyer profile information is received and stored for use in processing accounts payable functions on behalf of buyers. At block 310, contract data describing contract terms between each buyer and sellers with which the buyer intends to do business is received and stored.

When an invoice from a seller is received at block 320, the information in the invoice is compared to the contract data stored at block 310 for determining whether the invoice pertains to a particular transaction. If the invoice received at block 320 does not match any stored contract data, an error message is returned to the seller providing the invoice and/or to a buyer (if any) referenced on the invoice using information in the invoice and/or contract data. After the error message is returned, the process continues at block 385 as discussed further below.

If the invoice matches stored contract data at block 325, the invoice is audited at block 340 as a function of the matched contract data. The auditing may include, for example, comparing the value of the invoice with an expected value or value range stored with the contract data. This invoice value may include, e.g., a fixed value or a quantity-dependent value, such as a per-item cost for a transaction (or series of transactions) involving multiple items. In addition, the auditing may include comparing other invoice terms, such as payment date, discounts, surcharges and more, to ensure that the invoice addresses stored contract terms.

If the invoice is not deemed payable at block 345, an error message is returned to the seller providing the invoice and/or to a buyer (if any) as a function of information in the invoice and the contract data. After the error message is returned, the process continues at block 385 as discussed further below.

If the invoice is deemed payable at block 345 (via the audit at block 340), the invoice is processed at block 370, and payment is facilitated on behalf of the buyer to the seller in accordance with the contract data. The facilitated payment is then reflected in a credit account for the buyer at block 380, for assessing funds against the buyer at a future time.

After the facilitated payment is reflected in a credit account for the buyer at block 380, if the invoice failed to match stored contract data at block 325, or if the invoice was not deemed payable at block 345 as discussed above, the process continues at block 385. If a transaction period for processing payables on behalf of a particular buyer is over at block 385, a payment process for invoking payment from the particular buyer to cover payments made on behalf of the buyer is initiated at block 390. The payment process may involve approaches similar to those discussed above, wherein funds are withdrawn from an account for the buyer and/or credit is extended for the buyer. If the transaction period is not over at block 385, the process continues at block 320 for receiving additional invoices from sellers, until such a time when the transaction period is over.

Figure 4:
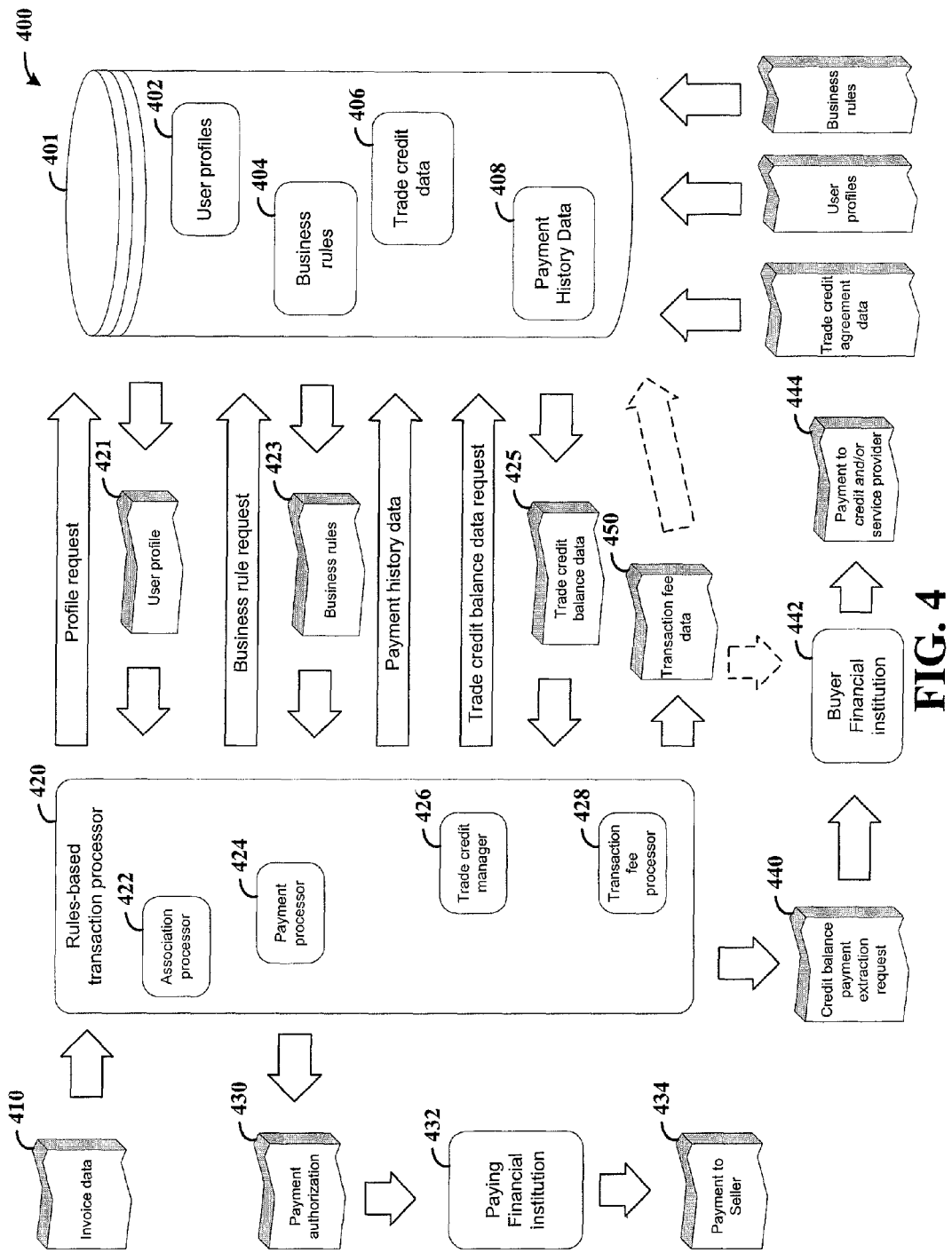
FIG. 4 shows an arrangement and approach to a trade-credit based transaction system, according to another example embodiment of the present invention.

FIG. 4 shows a trade credit arrangement 400 for processing trade-credit based transactions, according to another example embodiment of the present invention. A rules-based transaction processor 420 processes and manages transaction data for a variety of users, and facilitates the extension of trade credit for the users. A data storage arrangement 401, including one or more distinct storage components at one or more (geographical) locations, stores information used by the rules-based transaction processor 420 in managing user accounts and transactions as well as managing trade credit extended to users. Using preferences set by each user stored in user profile information 402 at the data storage arrangement 401, the rules-based transaction processor 420 processes payment on behalf of each user, tracks the processed payment and extends trade credit to the user to fund the processed payments. The trade credit is extended using credit terms set via the rules-based transaction processor 420, with transaction fees further selectively assessed against each user.

The trade credit arrangement 400 is implemented in one or more of a variety of manners, depending upon the parties to the transaction, the transaction itself and information available for use in processing transactions and extending trade credit for the transactions. The following discussion is directed to example approaches implemented with the system 400.

User profiles 402, business rules 404 and trade credit agreement data 406 are received and stored in the data storage arrangement 401. This data is stored directly via a service provider operating the arrangement 400 or via the rules-based transaction processor 420 (e.g., controlling user access to the data storage arrangement 401).

The user profiles 402 include information about users authorized to interact with the trade credit arrangement 400, and other information as discussed in the above examples. Profile information is stored for parties to transactions processed by the trade credit arrangement 400, such as buyers, sellers and/or financial providers.

The business rules 404 include, for example, contract data identifying contract terms between buyers and sellers. In some applications, the business rules 404 define a range of acceptable business practices, with effective contracts between buyers and sellers being created by the rules-based transaction processor 420 as a function of the business rules; where exceptions occur during contract creation, user interaction is requested to address the exception (where appropriate).

The trade credit agreement data 406 includes buyer-specific information used in extending credit to the buyer for use in paying for transactions processed by the trade credit arrangement 400. This information may include, for example, the identification of a financial institution or institutions from which to extract payment or from which to extend trade credit. Where the operator of the trade credit arrangement 400 extends credit on behalf of a buyer, the trade credit agreement data 406 includes information such as interest rates, repayment periods, approval levels (e.g., credit limits) and more. In this context, and operator may be an entity running physical (e.g., hardware, software) aspects of the trade credit arrangement 400, or an operator managing data (e.g., business rules, profiles) and user access/participation implemented by the trade credit arrangement.

In one scenario, invoice data 410 is sent to the rules-based transaction processor 420. An association processor 422 uses information in the invoice data 410 to generate a profile request to be sent to the data storage arrangement 401 (e.g., using a user ID or similar information in the invoice data 410). The data storage arrangement 401 returns user profile information 421, which the association processor 422 uses to associate a particular buyer with the invoice data 410.

Once a particular buyer is associated with the invoice data 410, the rules-based transaction processor sends a request for business rule data for the particular buyer, and business rules 423 are returned from the data storage arrangement 401. A trade credit manager 426 requests a trade credit balance of the data storage arrangement 401, which returns trade credit balance data 425 that is used by the rules-based transaction processor to determine whether the particular buyer has sufficient trade credit with which to fund payment for the invoice data 410. If sufficient trade credit is available, the business rules are used to authorize payment for the invoice data 410, with payment authorization data 430 sent to a paying financial institution 432 to make a payment 434 to a seller on behalf of the particular buyer. In some applications, an operator of the trade credit arrangement 400 operates or otherwise implements the financial institution 432.

The payment processor 424 also sends payment information to the data storage arrangement 401, which stores payment history data 408 for each buyer for maintaining a record of payments made on behalf of buyers. On a periodic or other basis as specified by the trade credit data 406, the trade credit manager 426 uses the trade credit balance data 425 to generate an extraction request 440 that is sent to a buyer financial institution 442 specified by the buyer for which the request is sent (e.g., in business rules 404). The buyer financial institution 442 then sends a payment 444 to the trade credit provider, such as the paying financial institution 432, the payment including funds reflecting payment terms (e.g., interest and/or service fees) specified in the trade credit data 406 for the particular buyer for whom payment is made.

In some applications, the rules-based transaction processor 420 implements a transaction fee processor 428 to assess a transaction fee against the buyer or another party to a transaction for which trade credit is extended. Transaction fee data 450 is sent to a buyer financial institution and/or the data storage arrangement 401 for use in facilitating payment for the transaction fee. In some applications, the transaction fee is assessed to a buyer on a periodic basis as a flat fee and/or as a function of the amount or amounts of payment authorization(s) 430 made during a particular period.

Figure 5:
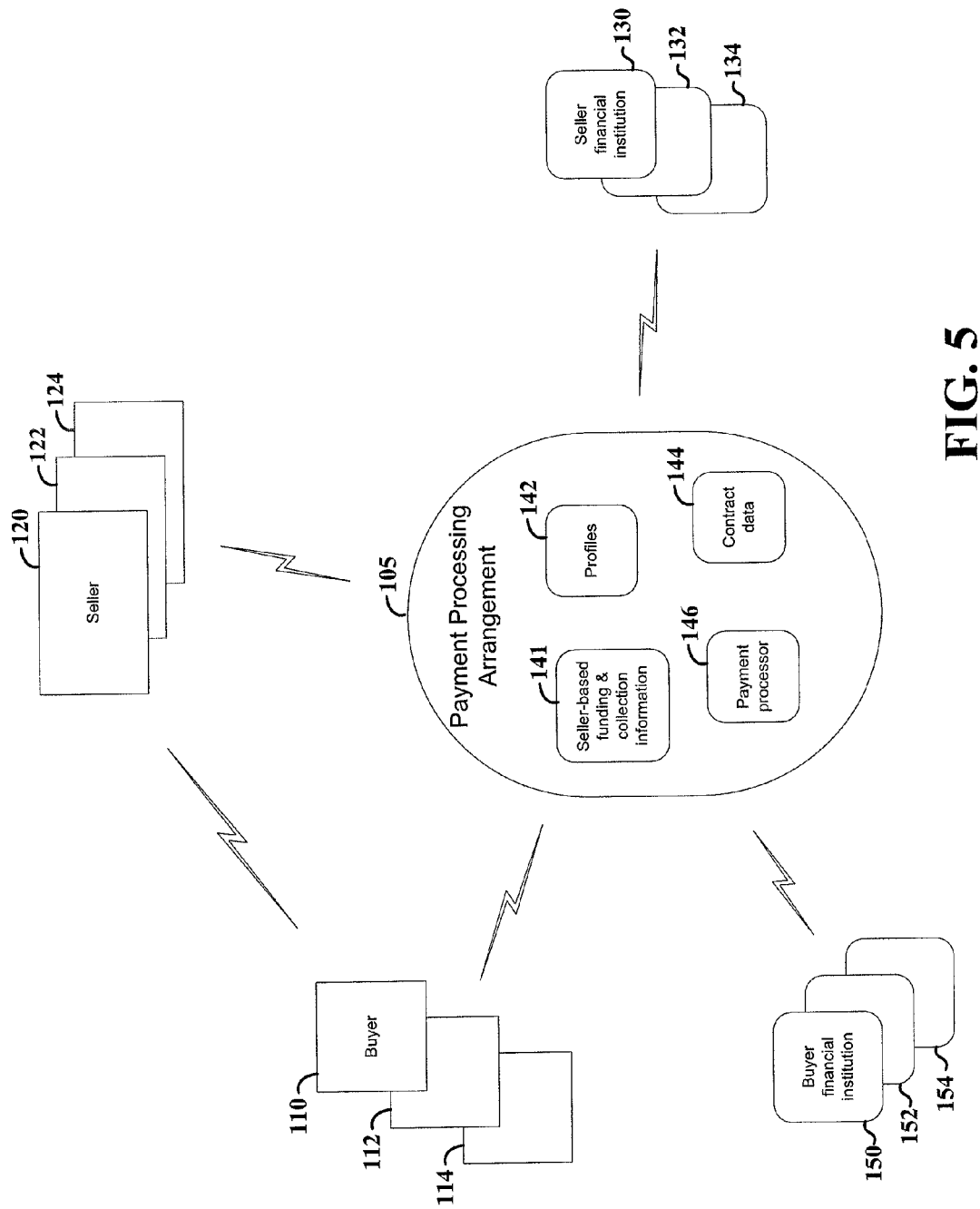
FIG. 5 shows a transaction processing arrangement and approach, according to an example embodiment of the present invention.

FIG. 5 shows an accounts receivable purchasing processing arrangement and approach, according to another example embodiment of the present invention. Aspects of the arrangement in FIG. 5 are similar to those in connection with FIG. 1; in this regard, while certain items are labeled similarly, strict correspondence between modules of FIGS. 1 and 5 may be present, but not required, for all implementations.

A payment processing arrangement 105, which is remote from the buyer, the seller and the funding source, manages funding and collection for transactions between buying parties (e.g., owing parties) and parties that provide goods and/or services (e.g., owed parties providing merchant offerings) for which the buying parties ultimately make payment. A payment processor 146 uses seller-based funding and collection information 141, profiles 142 and contract data 144 in processing funding and collection for sellers in regards to designated buyers. A plurality of transaction parties including buyer parties 110-114 and seller parties 120-124 are shown by way of example. While certain buyer and seller parties are shown, these example embodiments and related approaches are applicable to a multitude of such parties, as well as to additional types of transactional parties, which may be implemented for a variety of situations.

In addition to the parties immediately taking part in the transactions, the payment processing arrangement 105 also interacts with financial institutions or those institutions' registered profiles with the payment processing arrangement by which funds are provided (or received) for transactions processed by the payment processing arrangement. In this regard, buyer financial institutions 150-154 and seller financial institutions 130-134 are also shown by way of example. In some applications, these financial institutions associate directly with buyers or sellers (i.e., buyers or sellers have accounts, agreements or other arrangements with such institutions that provide funds on behalf of, or directly from, corresponding buyers or sellers). In other applications, these financial institutions are engaged with the payment processing arrangement 105 (i.e., an operator thereof) to facilitate the extension of credit on behalf of a buyer, to extend an early payment to a seller at the seller's request, or to otherwise finance transactions processed by the arrangement 105. Such applications may, for example, be implemented in connection with the approach shown in FIG. 1, with the payment processing arrangement 105 implementing both seller-based payment information 140 and seller-based funding and collection information 141 for selectively financing payables (financing payable amounts owed by a buyer or buyers) and/or purchasing receivables (paying a seller or sellers in advance of buyer payment, and in turn collecting from an appropriate buyer or buyers).

Continuing to refer to FIG. 5, the seller-based funding and collection information 141 is stored for access by the payment processing arrangement 105 (e.g., either at the payment processing arrangement or at a remote accessible location, such as a buyer node or another database). The seller-based funding and collection information 141 generally includes a listing of authorized buyers for whom invoices may be processed on behalf of each seller.

In some applications, the seller-based funding and collection information 141 includes seller-specific funding terms such as maximum value of uncollected invoices for a defined buyer, for all defined buyers, or for all defined buyers in a specified country. The payment processing arrangement 105 uses the seller-based funding and collection information 141 in processing payment to each seller in accordance with invoices that each seller has issued to the defined buyer(s).

The profiles 142 are stored for each seller 120-124 for use by the payment processing arrangement 105 in processing funding and collection for each seller for invoices issued by each seller to authorized buyers. These profiles 142 generally include information for identifying and communicating with each seller, and information regarding each seller's use of the payment processing arrangement 105 for funding and collections (i.e., terms, conditions or other agreements between the seller and an operator of the payment processing arrangement 105 and, where appropriate, between the seller and one or more financial institutions).

The payment processing arrangement 105 processes funding and collections for transactions in accordance with the profiles 142. The profiles 142 depict usage terms such as trade credit limits, payment processing fees, trade credit extension characteristics (e.g., credit rate and/or term involved with trade credit) and other seller-specific terms. In some instances, the profiles 142 depict an approach by which buyers can approve invoices from sellers for payment, or conditions upon which the payment processing arrangement 105 can automatically fund invoices presented by a seller or sellers.

The payment information in the profiles 142 generally includes information sufficient for processing funding and collections on behalf of each seller. For instance, the funding and collections information may identify a financial institution or institutions that advance funds and provide collections services to each seller for approved invoices to an authorized buyer or buyers, as well as any associated authorization needed for accessing the funds from identified financial institution or institutions (e.g., 110-114, or 130-134). The payment information further identifies a time for funds release, or a function (e.g., conditions) for use in determining a time at which to release funds from each seller's financial institution, or from an appropriate buyer's financial institution, to fund invoices purchased from the sellers. In this regard, the use information discussed above as related to credit extension characteristics can be implemented with the payment information for assessing fees for credit extended during a time between advancing payment to a seller for an invoice to an authorized buyer and receiving funds from that authorized buyer for the invoice funded.

The contract data 144 is selectively implemented by the payment processing arrangement 105 for processing funding and collection on behalf of each seller. The contract data 144 specifies characteristics of agreements between buyers and sellers, sets forth terms relating to payment and, in some instances, other aspects of transactions. For example, where buyer 110 contracts for goods with seller 120, a corresponding contract may specify terms by which the seller 120 is to be paid or by which the buyer 110 is to accept (or decline) goods and other contractual terms as typically implemented in connection with payment processing. The payment terms may, for example, indicate a period or other time characteristic to be used in making payment (e.g., immediately, 30, 60 or 90 days) to the seller 120 on behalf of the buyer 110. The payment terms may also indicate a fee or credit, based on the time of payment (e.g., where a seller offers a credit for early payment and/or assesses a fee for a late payment, with early and late timing specified in the contract data 144).

Funds for each transaction are provided by one or more of the seller financial institutions on behalf of a particular seller, either at the time the goods or services described in the transaction are delivered to the buyer or at another time as contracted by each seller. For example, where a seller accelerates its payment for transactions, funds are provided by the one or more seller financial institutions for a multitude (if applicable) of payments made to the seller for invoices issued by the seller to one or more authorized buyers. Financial institutions providing accelerated payment then collect at a later time, either from the seller to which payment has been advanced (e.g., at a time after the seller has been paid by a buyer for a financed transaction), or from a buyer or buyer's financial institution.

In one specific example, seller 120 sells goods or services to buyers 110, 112 and 114. Seller 120 invoices each buyer (110, 112 and/or 114) and the invoices are communicated to the payment processing arrangement 105 by the seller. The invoices are audited to ensure that the invoices are payable, either by the buyer 110 or by the payment processing arrangement 105 (in accordance with profiles 142 and/or contract data 144 for the seller 120 and/or for an appropriate buyer). Funds for the invoices are provided to seller 120 (e.g., by one of the seller financial institutions 130-134) in anticipation of future payment to be made by one of the buyers 110, 112 and/or 122. As discussed above, this future payment may be made to an appropriate seller, where the funding financial institution then collects from the seller, or the future payment can be made directly from an appropriate buyer (e.g., via the payment processing arrangement 105). The future payment is thus made via the payment processing arrangement 105 in accordance with payment terms in the contract data 144 for the seller 120 and the buyers 110, 112 and/or 122.

The payment processing arrangement 105 records the paid invoices to generate a receivables record for each approved invoice to each authorized buyer 110, 112 and 122. As payments are received from buyers 110, 112 and 122, the payment processing arrangement applies these payments against the appropriate receivables records. A payment processing period is selectively set in accordance with an agreement between each seller and an entity operating the payment processing arrangement 105 (or otherwise purchasing the seller's invoices) and stored in the profiles 142 for the seller. Funds are advanced to each seller for invoices to a particular buyer or buyers from one or more seller financial institutions 130-134 in accordance with the profiles 142 for the buyer (e.g., daily).

In some implementations, the payment processing arrangement 105 maintains an exposure record for each buyer. In this manner, the payment processor can continue to advance funds to a seller without receiving payments from appropriate buyers with the payment processing arrangement 105 assessing funding fees against each seller and holding some or all of the funds in the exposure record over into a subsequent transaction period. In certain applications, the amount of funds held over is subject to a particular credit limit established for a particular buyer with a corresponding seller (e.g., as stored on behalf of the seller in the profiles 142), or to a credit limit associated only with the corresponding seller (i.e., where the seller remains responsible to the financing institution). Such a credit limit may also be implemented in connection with a total amount of credit that the payment processing arrangement 105 extends to a particular seller by purchasing invoices during a particular transaction period and/or over the course of several transaction periods (where the credit record is held over into a subsequent transaction period).

In certain specific embodiments, the approaches as shown in and described in connection with FIG. 4 are implemented with a freight-type of transaction as described in U.S. Pat. No. 5,910,896 to Hahn-Carlson. Other specific embodiments are directed to the implementation of transaction processing approaches for collaboration and/or other aspects of contract-based transactions as described in U.S. patent application Ser. No. 10/436,878 ("Automated Transaction Processing System and Approach"); Ser. No. 10/864,761 ("Automated Transaction Processing System and Approach"); and Ser. No. 11/149, 977 ("Distributor-based Transaction Processing Arrangement and Approach"), all to Hahn-Carlson. All of these patent documents are fully incorporated herein by reference. For example, relative to U.S. patent application Ser. No. 10/864, 761, incoming invoices may be matched using an anchor approach as described therein. As another example, relative to U.S. patent application Ser. No. 11/149,977, a credit-based approach is implemented as applicable to distributors of transaction processing in a manner not inconsistent with the discussion herein, such as with FIG. 4.

While certain aspects of the present invention have been described with reference to several particular example embodiments, those skilled in the art will recognize that many changes may be made thereto without departing from the spirit and scope of the present invention. For example, contract terms described may be implemented in the form of business rules for a particular entity and may further be facilitated by the entity's user profiles. In addition, a multitude of different types of transaction parties, at different levels, may be implemented using the above discussed approaches. For instance, where instances of performing sellers are described, one or more tiers of such performing sellers may be implemented, wherein each performing seller can thus act as an intermediary seller. Aspects of the invention are set forth in the following claims.

What is claimed is:

1. An automated electronic payment processing arrangement for processing payment for transactions involving buyers and sellers, the arrangement including a computer-based processor configured and programmed to:
   receive an invoice;
   associate, as a function of electronically-stored contract data for a contract between a buyer and a seller, the invoice with data characterizing a transaction involving the buyer and the seller, the buyer being a subsidiary of a parent buyer;
   audit the invoice using the contract data to ensure that a payment to the seller is proper;
   process, when the payment to the seller is proper, the payment on behalf of the buyer by extending credit to the buyer for the payment using credit-based characteristics for at least one of the buyer and the seller; and
   generate a computer-readable record characterizing the payment;
   use the contract data to selectively assess against at least one of the buyer and the seller a fee for the payment; and
   facilitate, using the computer-readable record, a funds transfer from the parent buyer to cover payments made on behalf of the buyer for different transactions for which payment is made during a payment period by computing a total amount of payments made during the payment period using computer-readable records for the different transactions.

2. The arrangement of claim 1, wherein the computer-based processor uses profile data for the parent buyer to process the funds transfer to a financial system for the seller.

3. The arrangement of claim 1, wherein the computer-based processor uses profile data for the buyer to process the funds transfer to a financial system for the seller.

4. The arrangement of claim 1, wherein the funds transfer is to an electronic financial system for the seller and the funds transfer is an electronic funds transfer for paying the seller an amount that is equal to an amount owed by the buyer to the seller, less a fee selectively assessed against the seller for the payment.

5. The arrangement of claim 1, wherein the computer-based processor facilitates an electronic funds transfer to cover the payments by collecting funds from the buyer.

6. The arrangement of claim 1, wherein the computer-based processor facilitates an electronic funds transfer to cover the payments by collecting funds from the seller.

7. The arrangement of claim 6, wherein the computer-based processor collects the funds from the seller upon the seller's receipt of funds from the buyer as payment for the transaction.

8. The arrangement of claim 1, wherein the computer-based processor facilitates the funds transfer by collecting funds provided by the parent buyer for the payment to the seller by automatically re-routing funds, provided by the parent buyer, that are designated for electronic transfer to the seller.

9. The arrangement of claim 1, wherein the funds transfer is a first funds transfer and the computer-based processor facilitates a second funds transfer to cover the fee.

10. An automated electronic payment processing system for auditing and processing payment for electronic transactions involving buyers and sellers, the system comprising:
   a database that stores contract data for established contracts between the buyers and the sellers, profile data for each of the buyers and the sellers, and data for correlating the contract data and the profile data with received invoice data sets for the transactions;
   a tracking database that stores payment-based historical data for the transactions; and
   a computer-based processor configured and arranged to:
      associate an invoice data set with contract data for a contract between a buyer and a seller, the invoice data set characterizing a transaction involving the buyer and the seller;
      associate, as a function of the contract data associated with the invoice data, the invoice data set with the profile data for at least one of the buyer and the seller;
      audit the invoice data set using the contract and the profile data associated with the invoice data set to ensure that a payment to the seller is proper;
      process, when the payment to the seller is proper, the payment to an electronic financial system on behalf of the buyer by extending credit to the buyer for the payment, the electronic financial system identified in the electronic profile data associated with the seller;
      generate computer-readable record data characterizing seller payments made on behalf of a buyer and store the computer-readable record data in the tracking database;
      selectively assess a fee against the seller for processing credit-based electronic payments by generating computer-readable fee data to electronically associate the fee and an amount of the fee with the seller; and
      facilitate an electronic funds transfer to cover payments made on behalf of the buyer for different transactions for which payment is made during a payment period by computing a total amount of payments made during the payment period using computer-readable records for the different transactions, the computer-based processor facilitating the electronic funds transfer using the generated computer-readable record data stored in the tracking database for at least one transaction involving the buyer and electronic payment system information in the associated profile data.

* * * * *